Jan. 29, 1952          J. L. SHUCK          2,583,894

AUTOMATIC DOOR MAT FOR AUTOMOBILES

Filed June 5, 1950          2 SHEETS—SHEET 1

James L. Shuck
INVENTOR.

BY

Jan. 29, 1952 J. L. SHUCK 2,583,894
AUTOMATIC DOOR MAT FOR AUTOMOBILES
Filed June 5, 1950 2 SHEETS—SHEET 2

James L. Shuck
INVENTOR.

BY *Clarence A. O'Brien*
*and Harvey B. Jackson*
Attorneys

Patented Jan. 29, 1952

2,583,894

UNITED STATES PATENT OFFICE 2,583,894

AUTOMATIC DOOR MAT FOR AUTOMOBILES

James L. Shuck, Corydon, Ind.

Application June 5, 1950, Serial No. 166,107

1 Claim. (Cl. 280—166)

This invention relates to improvements in attachments for vehicles.

An object of this invention is to provide an improved step and shoe cleaner pad for an automobile of the type which has a swinging door and a frame, the device including a mounting assembly having a pair of tubes with sleeves slidable on the tubes and a step secured to said tubes, the assembly being located adjacent the door of the vehicle whereby when the step is moved outwardly it may be used by the individual concerned with entering or leaving the vehicle and whereby a means may be attached to the door of the vehicle for moving the step inwardly to an inoperative position in response to and as a direct result of closing the door.

A further object of this invention is to provide a device of the class described above which has incorporated therewith an improved latching device which is foot-operated so that it will be convenient not only to use but also to operate.

Ancillary objects and features of novelty will become apparent in following the description of the illustrated form of the invention.

Figure 1:
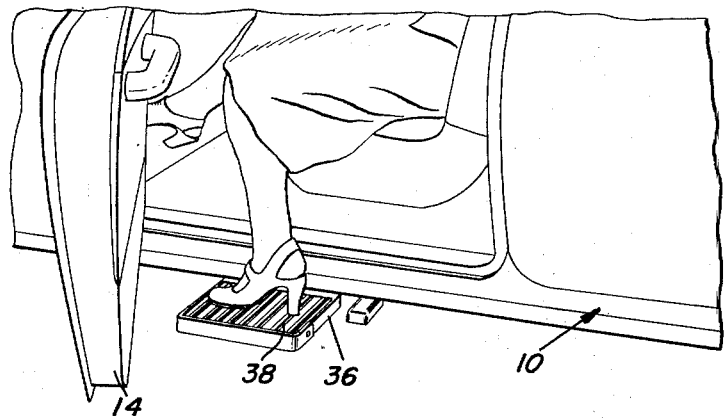
Figure 1 is a fragmentary perspective view of a part of a vehicle showing the device in use.
Figure 3:
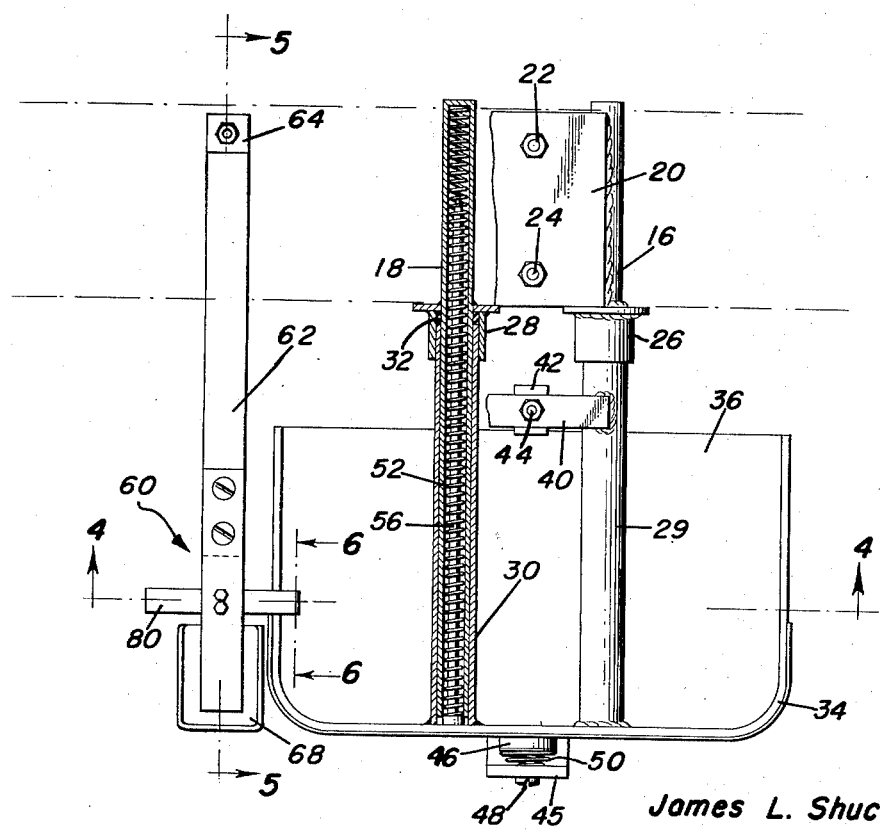
Figure 3 is a bottom view of the attachment, portions being broken away in section to illustrate internal detail.
Figure 2:
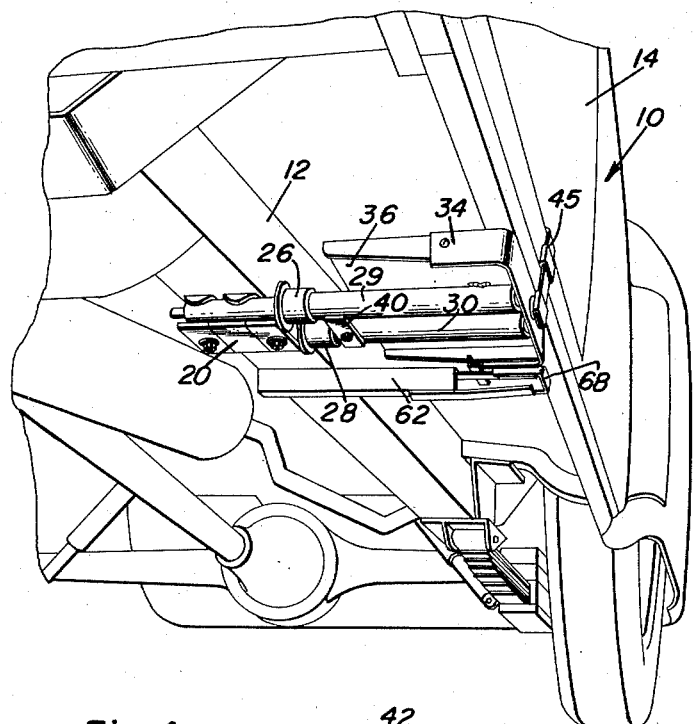
Figure 2 is a fragmentary perspective view of a part of the undercarriage of a vehicle showing the attachment applied thereto.
Figure 4:
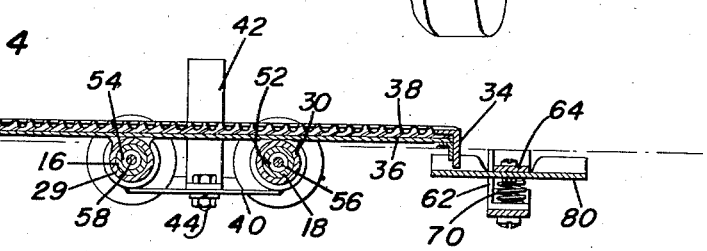
Figure 4 is a transverse sectional view taken substantially on the line 4—4 of Figure 3 and in the direction of the arrows.
Figure 5:
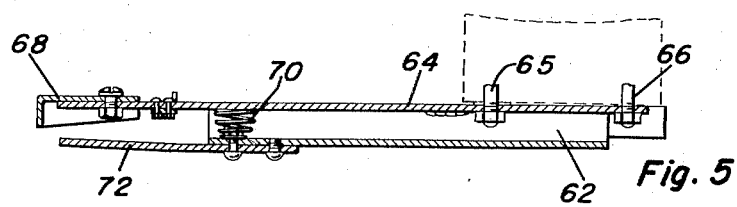
Figure 5 is a sectional view taken substantially on the line 5—5 of Figure 3 and in the direction of the arrows.
Figure 6:
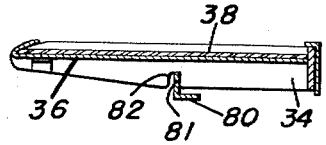
Figure 6 is a sectional view taken substantially on the line 6—6 of Figure 3 and in the direction of the arrows.

In carrying out the invention there is illustrated a part of a vehicle 10 with the usual undercarriage including a frame 12, and a door 14.

A pair of sleeves 16 and 18 respectively are held in spaced and parallel relationship by means of a mounting bracket which includes a plate 20 welded or otherwise rigidly fixed to each sleeve. Conventional bolts 22 and 24 passing through holes in the mounting plate 20 are used to attach the sleeves to one of the members of the frame 12 adjacent a side of the vehicle. Collars 26 and 28 which are slightly larger in diameter than the sleeves 18 and 16, are welded or otherwise rigidly fixed to the sleeves intermediate their ends.

A pair of tubes 29 and 30 respectively are slidable on the exterior surface of the sleeves 16 and 18 and the inner ends thereof form a limiting means for the sliding movement of the tubes on the sleeves. The inner ends of the tubes are adapted to engage the sponge rubber bushings 32 which form stops, anti-rattling devices, and also dirt and water shields. Of course, in lieu of sponge rubber, other resilient material may be employed.

The outer ends of the tube are fixed to a flange 34 around the step 36 which has a replaceable mat 38 thereon. The step is used in the capacity as shown in Figure 1 and is movable inwardly and outwardly with respect to the side of the vehicle. The step may be made of grate type which would allow dirt to fall through.

In order that the tubes 29 and 30 move in unison, a strap 40 is welded thereto and has an upwardly extending bracket 42 carried thereby, as by the bolt 44. This upwardly extending bracket is fixed to the inside edge of the step 36 thereby insuring a firm connection between that end of the step and the tubes, the opposite end of the step being connected by means of welding or the like to the outer ends of the tubes 29 and 30.

An operating bracket 45 is secured to the door 14 of the vehicle and extends downwardly therefrom. This bracket is provided with a rubber bumper 46 which is mounted on the bolt 48, carried by the bracket 45, and a spring 50 reacting on the bumper 46 and a part of the bracket 45 serves as a shock absorber. The purpose of the bracket 45 is to close the step 36 automatically and in response to closing the door of the vehicle.

Each sleeve is provided with a spring 52 and 54 respectively, the springs reacting on the closed inner ends of the sleeves and the step 36, constantly urging the step outwardly from the side of the vehicle, thereby constantly urging the tubes 29 and 30 in an extensible manner with respect to the sleeves 16 and 18. Guide rods 56 and 58 for the springs are arranged in concentric relation with the springs 52 and 54.

Accordingly, the previously described structural arrangement provides a step which will be urged constantly outwardly from the side of the vehicle and which may be closed either by a person pushing it with his or her foot or may be closed by simply shutting the door of the vehicle and having the strap 45 used for a door closer.

A latch generally indicated at 60 is provided for the purpose of releasably holding the step in the closed position. This latch consists of an angle member 62 which is welded to a strap 64 adjacent one end thereof. The strap is fixed to the frame 12 of the vehicle adjacent the step by suitable means, as the bolts 65 and 66. The connection between the strap 64 and 62 is sufficiently far from the outer end of the strap to allow the strap to be flexed. A foot plate 68 is disposed on the outer end of the strap 64 and is opposed in its flexing operation by means of the spring 70 which is seated on the angle member 62 and which bears against the bottom surface of the strap 64. A limit strip 72 is secured to the angle member 62 and extends to a position below the foot plate 68. This provides a limit for the downward movement of the strap 64. To simplify manufacturing of the latch, strap 64 could be made of the necessary spring steel and could alone serve as a latch.

A transverse angle member 80 is bolted or otherwise rigidly fixed to the strap 64 and is movable with the strap 64. A flange of the transverse angle member 80 is disposed in the notch 82 which opens downwardly in the flange 34 around at least a part of the step 36.

In operation of the latch, the foot receiving member 68 is depressed thereby separating the vertical flange 81 of the angle member 80 from the notch 82. This permits the springs 52 and 54 to urge the step 36 outwardly to a position where the stored energy of the springs will no longer overcome the frictional resistance between the tubes and sleeves.

The moving of the step inwardly has been described previously.

It will be noted that if found desirable, the entire assembly may be covered by a plate in order to prevent a collection of dirt thereon. It is within the purview and teaching of this invention to provide other modifications such as the extension of the plate 20 so as to also mount the inner end of the latching assembly. This is probably the preferable system inasmuch as only one assembly need be attached to the vehicle by this expedient.

Having described the invention, what is claimed as new is:

In a vehicle which includes a frame and a door, an attachment comprising a step, means attached to the frame for supporting said step, a spring carried by said means constantly urging said step outwardly of said means, a latch releasably holding said step inwardly of said means, and an operator secured to the door and engageable with said step to displace the step inwardly of said means when the door is closed, said means including a pair of sleeves, a bracket secured to said sleeves holding said sleeves in parallel spaced relation, tubes secured to said step and slidably disposed on said sleeves, collars fixed to said sleeves, and resilient bushings in said collar forming stops for the inner ends of said tubes.

JAMES L. SHUCK.

REFERENCES CITED

The following references are of record in the file of this patent:

UNITED STATES PATENTS

| Number | Name | Date |
|---|---|---|
| 756,507 | Knopf | Apr. 5, 1904 |
| 1,017,096 | Harris et al. | Feb. 13, 1912 |
| 1,154,228 | Baumann | Sept. 21, 1915 |
| 1,616,793 | Goss | Feb. 8, 1927 |
| 1,621,997 | Nigro | Mar. 22, 1927 |
| 1,718,428 | McNulty | June 25, 1929 |
| 2,018,064 | Hofacker | Oct. 22, 1935 |
| 2,145,647 | Evans | Jan. 31, 1939 |